US008286986B2

(12) United States Patent
Drake et al.

(10) Patent No.: US 8,286,986 B2
(45) Date of Patent: Oct. 16, 2012

(54) GOOSENECK COUPLER (75) Inventors: Frank Drake, Wausau, WI (US);
Michael Murphy, Wausau, WI (US)

(73) Assignee: Cequent Performance Products, Inc., Plymouth, MI (US)

( * ) Notice: Subject to any disclaimer, the term of this patent is extended or adjusted under 35 U.S.C. 154(b) by 0 days.

(21) Appl. No.: 12/971,960

(22) Filed: Dec. 17, 2010

(65) Prior Publication Data

US 2012/0153598 A1    Jun. 21, 2012

(51) Int. Cl.
*B60D 1/46* (2006.01)

(52) U.S. Cl. .................. 280/490.1; 280/441.2

(58) Field of Classification Search ............... 280/490.1, 280/425.2, 441.2
See application file for complete search history.

(56) References Cited

U.S. PATENT DOCUMENTS

| 5,147,096 | A | * | 9/1992 | Rogers | 280/507 |
| 5,482,309 | A | * | 1/1996 | Hollis | 280/423.1 |
| 5,868,415 | A | * | 2/1999 | Van Vleet | 280/483 |
| 6,234,509 | B1 | * | 5/2001 | Lara | 280/425.2 |
| 6,264,229 | B1 | * | 7/2001 | Gill et al. | 280/441.2 |
| 6,880,368 | B1 | * | 4/2005 | Ulbrich et al. | 70/14 |
| 7,097,193 | B1 | * | 8/2006 | Sievert | 280/441.2 |
| 7,100,937 | B2 | * | 9/2006 | Hogan | 280/507 |
| 7,762,529 | B1 | * | 7/2010 | Scott | 254/120 |
| D646,209 | S | * | 10/2011 | Story | D12/161 |
| 2003/0001362 | A1 | * | 1/2003 | Ebey | 280/441.2 |
| 2003/0047908 | A1 | * | 3/2003 | Lara | 280/441.2 |

* cited by examiner

*Primary Examiner* — Tashiana Adams
(74) *Attorney, Agent, or Firm* — McDonald Hopkins LLC (57) ABSTRACT

A gooseneck coupler for engaging a towed vehicle to a towing vehicle is described. The coupler includes an outer tube having apertures that is moveable relative to an inner tube secured to a base plate. A locking plate is pivotally secured to the base plate, wherein the locking plate and base plate both include alignable locking pin apertures. A locking assembly includes a handle and a locking pin that is insertable into the locking pin apertures. A support bracket is secured to the inner tube. The support bracket includes a stop portion and a spacer portion that aligns the locking pin into the locking pin apertures. The coupler also includes set screws locatable through the apertures, wherein the set screws are tightened onto the inner tube to prevent movement of the outer tube. The set screws function as a visual indicator that the outer tube has been over extended.

32 Claims, 5 Drawing Sheets

GOOSENECK COUPLER

FIELD OF THE INVENTION

The present invention is generally related to a coupler for securing a trailer to a towing vehicle and, more particularly, to a gooseneck coupler.

BACKGROUND

Many vehicles are designed to transport freight, goods, merchandise, personal property, and other such cargo. Often, such vehicles may be arranged to tow a trailer by attaching the trailer to the towing vehicle, such as through the use of a hitch assembly. The towing industry has developed a number of methods and apparatuses for securing or engaging the towed vehicle or trailer to the towing vehicle, such as a truck.

There are many different types of trailer hitches in the art that may be attached to the towing vehicle in a variety of ways, depending on the type of hitch. Some of the most common types of hitches include gooseneck, fifth wheel, front mount, and the like. Typically, trailers may be connected to the towing vehicle by way of a hitch assembly including a ball hitch or member secured to the towing vehicle and a ball socket coupling mechanism on the towed vehicle or trailer that mounts over the ball and thereby allows for the trailer to pivot behind the towing vehicle.

Numerous types of hitch balls have been developed to be attached to the bumper or other rear portion of a towing vehicle. The trailer or towed vehicle may be equipped with a coupler mechanism to be attached to the towing vehicle by placing the coupler mechanism over the hitch ball and securing the coupler to the hitch ball. Similar apparatus using hitch receivers attached to the rear of the towing vehicle and drawbars may be used to secure trailers to towing vehicles.

Some trailers may be designed to carry heavy loads. Connecting such a trailer to a ball hitch on a bumper of a towing vehicle, however, may be impractical. When a trailer load is heavy as compared to the weight of the towing vehicle, applying the trailer load over the rear axle of the towing vehicle may create a more desirable towing condition. In addition, such an arrangement may put much of the force of the trailer load onto structural members of the towing vehicle, such as the frame, whereby the hitch ball may be located in the truck bed.

There are generally two arrangements for securing a trailer to the bed of a towing vehicle—a fifth wheel hitch and a gooseneck hitch. A fifth wheel hitch may be utilized with towed vehicles having a king pin, which may be part of a pin box attached to the towed vehicle. Fifth wheel hitches may generally be attached in a bed of a truck or directly to the frame of the truck in a more permanent manner, whereby tools may generally be required to remove fasteners and other connectors to install or uninstall a fifth wheel hitch to the bed of a towing vehicle. A gooseneck hitch may be utilized with a towed vehicle having a gooseneck coupler that may generally be coupled to a hitch ball that may be located in the bed of the towing vehicle. The hitch ball may typically be permanently secured to the frame or bed of the towing vehicle.

The trailer coupler often has a socket portion that is sized and shaped to receive the hitch ball. The gooseneck coupler may engage the hitch ball to pivotally couple the trailer to the towing vehicle. The gooseneck coupler to hitch ball connection may allow for relative movement between the towing vehicle and the towed vehicle as the towing vehicle makes turns, traverses uneven or rough terrain, and passes along inclining and declining roadways. The hitch ball member may be removed or lowered to a stowed position below the bed to ensure that the use of the bed is not substantially hindered by the presence of the ball.

The gooseneck coupler typically may include a manually operated clamping arrangement which may retain the ball member in the socket and, thus, the towed vehicle to the towing vehicle.

SUMMARY

A gooseneck coupler for engaging a towed vehicle to a towing vehicle is described. The gooseneck coupler may include an outer tube telescopically moveable relative to an inner tube, wherein the inner tube may be secured to a base plate. The gooseneck coupler may also include a locking plate, a locking assembly and a support bracket. The locking plate may be pivotally secured to the base plate, wherein the locking plate and the base plate may both include alignable locking pin apertures. The locking assembly may include a handle and a locking pin, wherein the locking assembly may be located adjacent the inner tube and the locking pin may be insertable into the locking pin apertures. The support bracket may be secured to the inner tube, wherein the support bracket may include a stop portion and a spacer portion. The spacer portion may align the locking pin into the locking pin apertures. The outer tube may rest upon the stop portion when in a retracted position. The handle may also rest upon the stop portion when in an unlocked position.

The outer tube of the gooseneck coupler may also include at least two apertures. The gooseneck coupler may include at least two set screws. The set screws may be locatable through the at least two apertures of the outer tube. The at least two set screws may be tightened onto the inner tube to prevent movement of the outer tube relative to the inner tube. The set screws may also function as a visual indicator when the outer tube may be over extended. The set screws may not tightly evenly against the inner tube when the outer tube is extended beyond a height of the inner tube.

BRIEF DESCRIPTION OF THE DRAWINGS

Objects and advantages together with the operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

A gooseneck coupler 10 is illustrated in FIGS. 1-8. The gooseneck coupler 10 may be configured to engage a towing vehicle (not shown), such as a truck, and a towed vehicle, such as a trailer (not shown). The gooseneck coupler 10 may be of any appropriate shape, size, type or configuration. The gooseneck coupler 10 may include an outer tube 12, an inner tube 14, a locking plate 24 and a support bracket 42.

Figure 1:
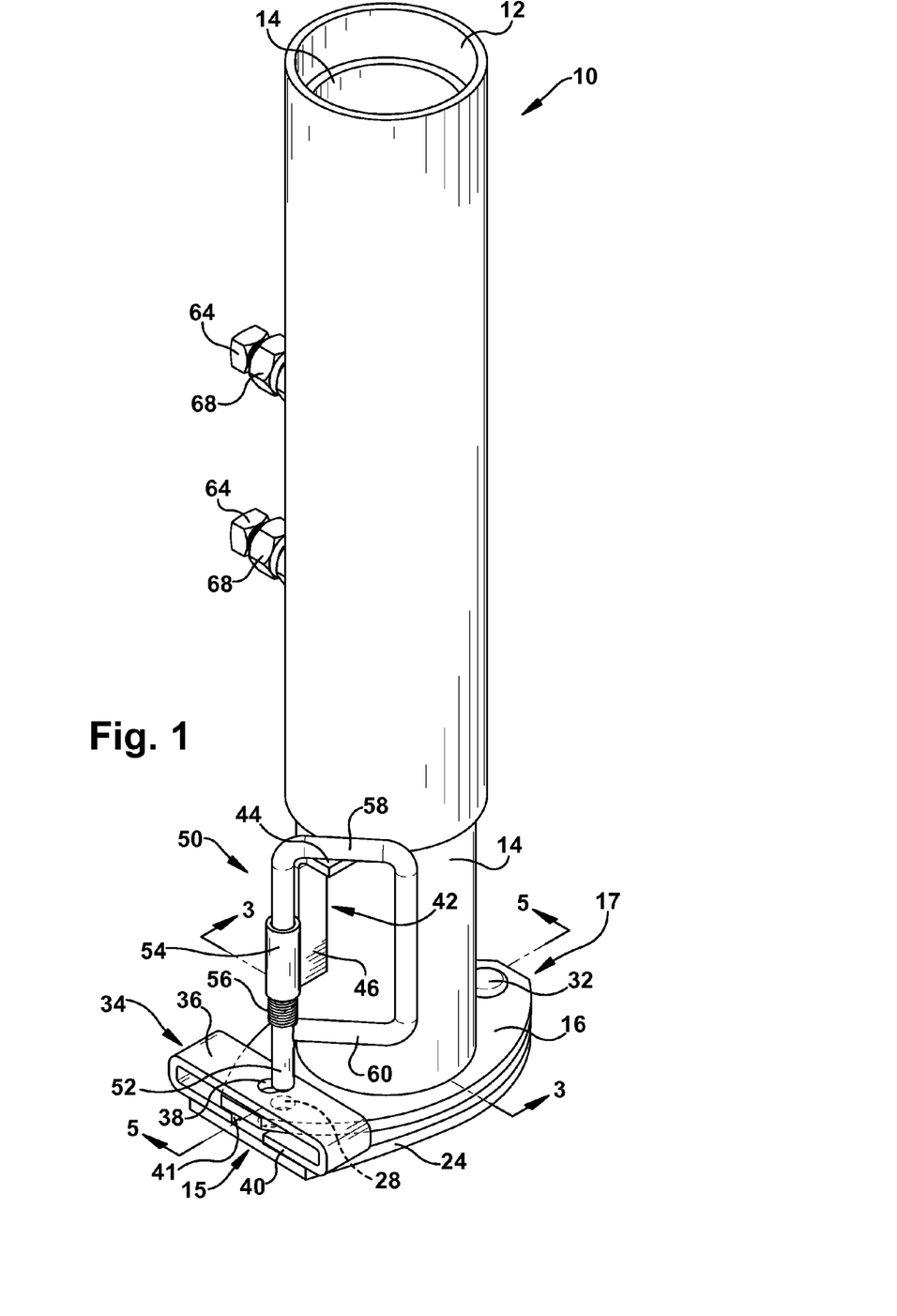
FIG. 1 illustrates a perspective view of an embodiment of a gooseneck coupler in a non-limiting example according to the present teachings in an unlocked position.
Figure 2:
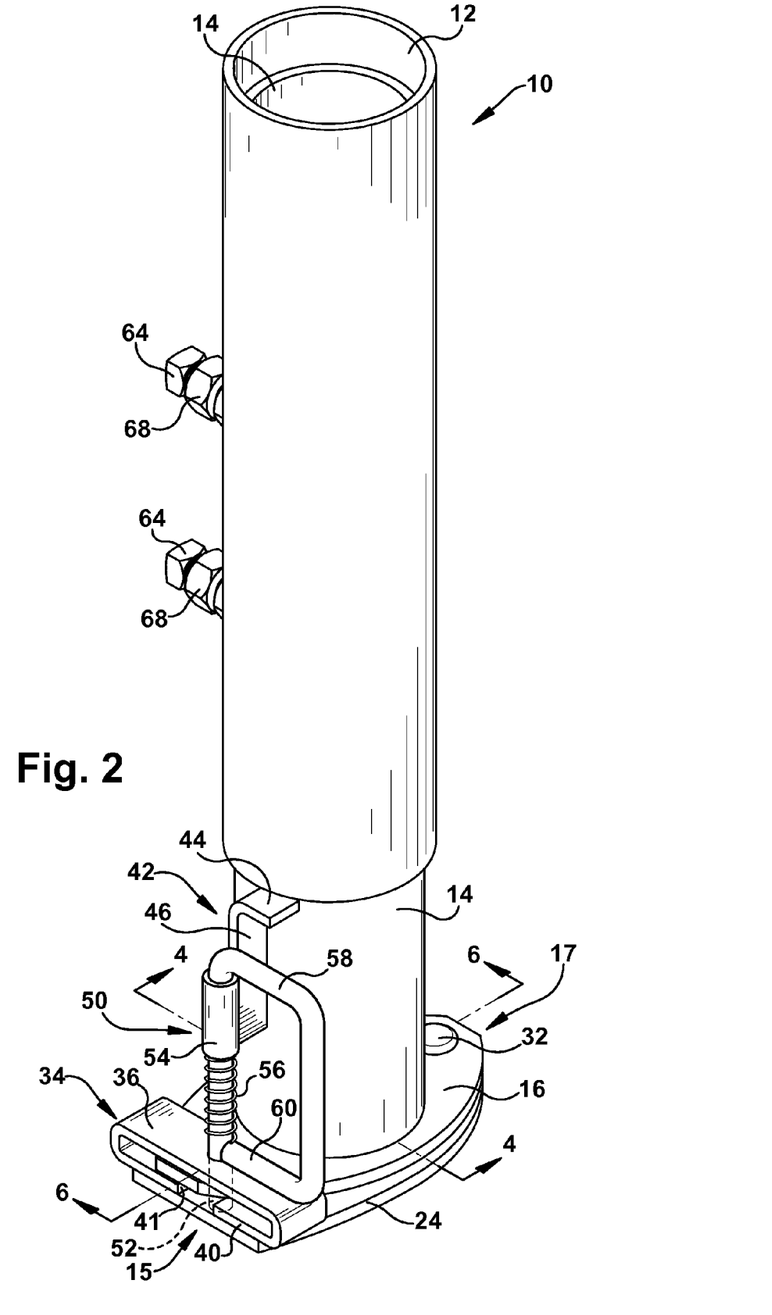
FIG. 2 illustrates a perspective view of the gooseneck coupler of FIG. 1 in a locked position.
Figure 3:
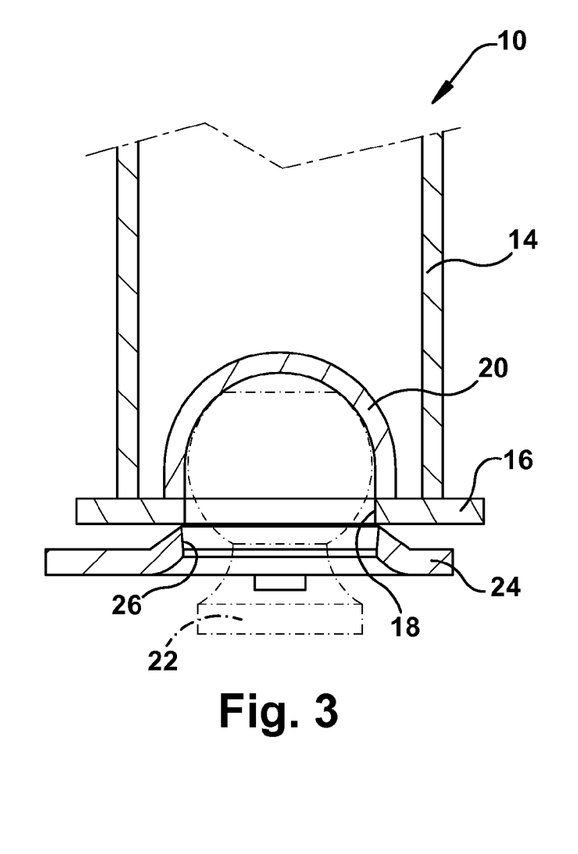
FIG. 3 illustrates a partial cross-sectional side view taken along line 3-3 of FIG. 1.
Figure 4:
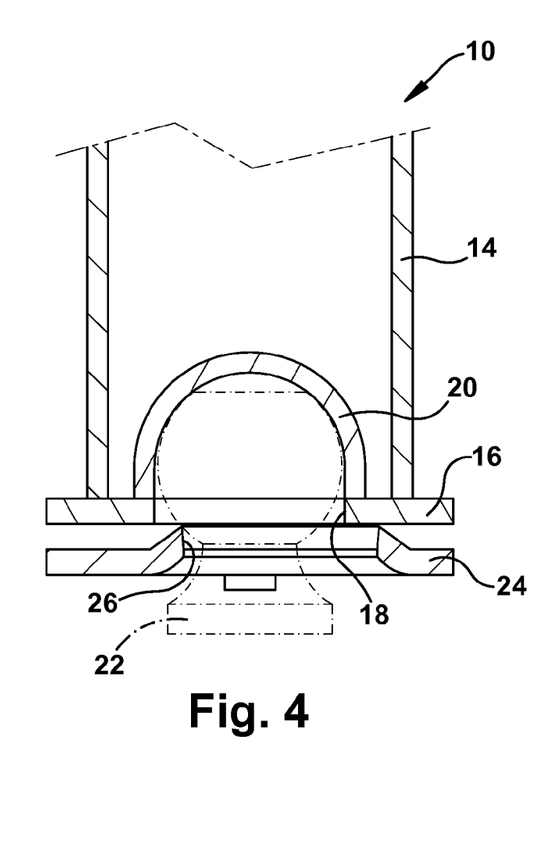
FIG. 4 illustrates a partial cross-sectional side view taken along line 4-4 of FIG. 2.

The outer tube 12 may be of any appropriate shape, size, type or configuration, such as of a generally cylindrical or rectangular tubular configuration (FIGS. 1 and 2). The outer tube 12 may be located at any appropriate position on the gooseneck coupler 10, such as outside of and surrounding the inner tube 14. For example, the outer tube 12 may be of a slightly interior dimension than an exterior dimension of the inner tube 14.

The inner tube 14 may be of any appropriate shape, size, type or configuration, such as of a generally cylindrical or rectangular tubular configuration (FIGS. 1 and 2). For example, the inner tube 14 may be of a correspondingly similar shape as that of the outer tube 12. The inner tube 14 may be located at any appropriate position on the gooseneck coupler 10, such as located within a portion of the outer tube 12. For example, the inner tube 14 may be of a slightly smaller exterior dimension than an interior dimension of the outer tube 12.

The gooseneck coupler 10 may also include a base plate 16. The base plate 16 may be of any appropriate shape, size, type or configuration, such as of a generally ovular configuration (FIGS. 1 and 2). The base plate 16 may be located at any appropriate position on the gooseneck coupler 10, such as adjacent an end of the inner tube 14, such as a lower end. The inner tube 14 may be secured to the base plate 16 by any appropriate means, such as by welding or the like.

Figure 5:
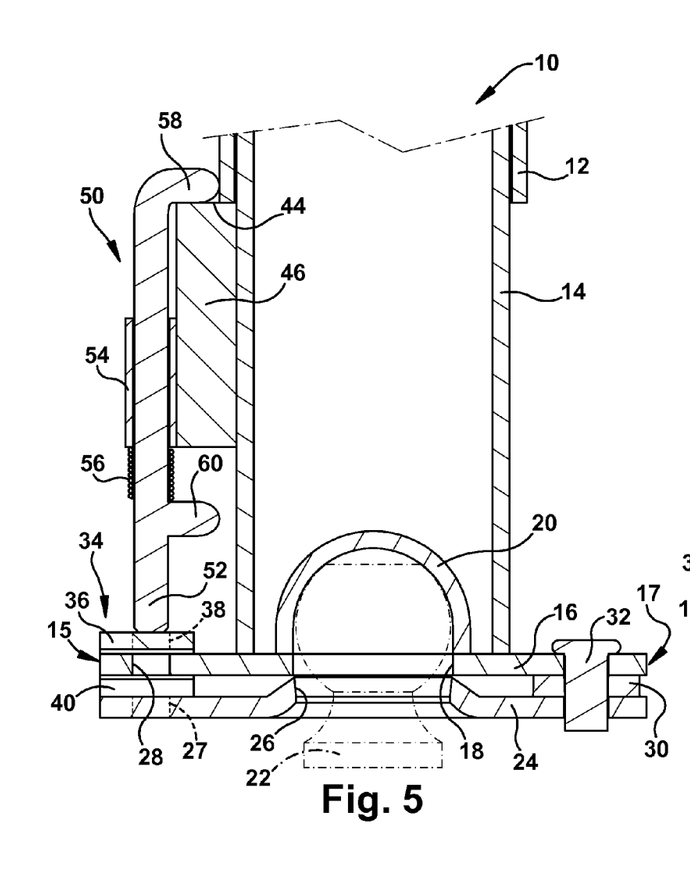
FIG. 5 illustrates a partial cross-sectional front view taken along line 5-5 of FIG. 1.
Figure 6:
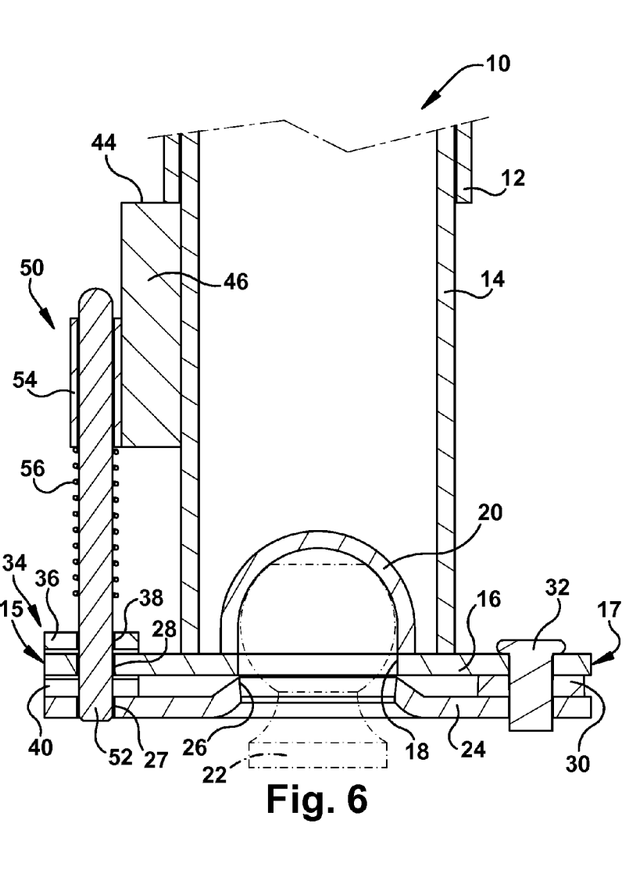
FIG. 6 illustrates a partial cross-sectional front view taken along line 6-6 of FIG. 2.

The base plate 16 may include an opening 18 and a locking pin aperture 28 (FIGS. 5 and 6). The opening 18 may be of any appropriate shape, size, type or configuration, such as a generally circular shape (FIGS. 3-6). The opening 18 may be located at any appropriate position on the base plate 16, such as at an approximate central location on the base plate 16. The opening 18 may provide access to a socket 20 (FIGS. 3-6).

The socket 20 may be of any appropriate shape, size, type or configuration, such as of a generally semi-spherical shape (FIGS. 3-8). For example, the socket 20 may be of a shape and size to receive a hitch ball 22 therein (FIGS. 3-8). The socket 20 may be located at any appropriate position on the gooseneck coupler 10, such as adjacent the opening 18 of the base plate 16 and the lower end of the inner tube 14 (FIGS. 3-6). The socket 20 may be secured to the base plate 16 by any appropriate means, such as by welding or the like. While the base plate 16 and socket 20 may be shown as separate components, it is to be understood that the base plate 16 and socket 20 may be fabricated as a single integral piece and should not be limited to that show or described herein.

The locking pin aperture 28 of the base plate 16 may be of any appropriate shape, size, type or configuration, such as of a generally circular shape (FIGS. 1, 5 and 6). The locking pin aperture 28 may be located at any appropriate position on the base plate 16, such as adjacent a first side 15 of the base plate 16.

The locking plate 24 may be of any appropriate shape, size, type or configuration, such as of a generally ovular or rectangular configuration (FIGS. 1 and 2). For example, the locking plate 24 may be of a similar shape and size as that of the base plate 16. The locking plate 24 may be located at any appropriate position on the gooseneck coupler 10, such as adjacent base plate 16. For example, the locking plate 24 may be located below the base plate 16 (FIGS. 1-8).

The locking plate 24 may include a hitch ball opening 26 and a locking pin aperture 27 (FIGS. 5 and 6). The hitch ball opening 26 may be of any appropriate shape, size, type or configuration, such as of a generally circular shape. For example, the hitch ball opening 26 may be of a similar shape and size as that of the opening 18 in the base plate 16. The hitch ball opening 26 may be located at any appropriate position on the locking plate 24, such as at an approximate central location on the locking plate 24, whereby the hitch ball opening 26 may generally align with the opening 18 in the base plate 16 (FIGS. 3-6).

The locking pin aperture 27 of the locking plate 24 may be of any appropriate shape, size, type or configuration, such as of a generally circular shape. The locking pin aperture 27 may be located at any appropriate position on the locking plate 24, such as adjacent the first side 15 of the base plate 16 and alignable with the locking pin aperture 28 of the base plate 16 (FIGS. 5 and 6).

This alignment of the opening 18 in the base plate 16 and the hitch ball opening 26 of the locking plate 24 may provide an entrance for the hitch ball 22 to enter into the socket 20 of the inner tube 14 (FIGS. 3-6). The hitch ball 22 of the towing vehicle may generally be located within and abut the socket 20 during engagement of the gooseneck coupler 10 and a towed vehicle.

The gooseneck coupler 10 may also include a base spacer 30 and a fastener 32 (FIGS. 5 and 6). The base spacer 30 may be of any appropriate shape, size, type or configuration, such as of a generally rectangular bracket. The base spacer 30 may be located at any appropriate position on the gooseneck coupler 10, such as located between the base plate 16 and the locking plate 24. The base plate 16, locking plate 24 and base spacer 30 may all include an aperture (not shown), whereby they may be secured to one another by the fastener 32 (FIGS. 5 and 6). The fastener 32 may be of any appropriate shape, size, type or configuration that may provide for a pivotal relationship between the base plate 16 and the locking plate 24.

The gooseneck coupler 10 may include a base bracket 34 (FIGS. 1, 2, 5 and 6). The base bracket 34 may be of any appropriate shape, size, type or configuration, such as of a generally sideways C-shaped configuration (FIGS. 1 and 2). For example, the base bracket 34 may include an upper portion 36 and a lower portion 40, whereby the lower portion 40 includes an opening 41 (FIGS. 1 and 2). The base bracket 34 may also include an aperture 38 (FIGS. 1, 5 and 6). The aperture 38 may be of any appropriate shape, size, type or configuration, such as of a generally circular shape. The aperture 38 may be located at any appropriate position on the base bracket 34, such as at an approximate central location on the upper portion 36.

The base bracket 34 may be located at any appropriate position on the gooseneck coupler 10, such as generally surrounding the first side 15 of the base plate 16 (FIGS. 1, 2, 5 and 6). For example, the lower portion 40 of the base bracket 34 may be located between the base plate 16 and the locking plate 24, whereby the opening 41 in the lower portion 40 may provide access to the locking pin aperture 27 of the locking plate 24 (FIGS. 2, 5 and 6).

The support bracket 42 may be of any appropriate shape, size, type or configuration, such as of a generally L-shaped configuration (FIGS. 1 and 2). The support bracket 42 may be located at any appropriate position on the gooseneck coupler 10, such as adjacent the lower end of the inner tube 14. The support bracket 42 may be secured to the inner tube 14 by any appropriate means, such as by welding or the like. The support bracket 42 may include a stop portion 44 and a spacer portion 46 (FIGS. 1, 2, 5 and 6).

The stop portion 44 may be of any appropriate shape, size, type or configuration, such as of a generally rectangular shape (FIGS. 1 and 2). The stop portion 44 may be located at any appropriate position on the support bracket 42, such as generally parallel to the base plate 16 and generally extending perpendicularly outward from the inner tube 14 (FIGS. 1 and 2).

The spacer portion 46 may be of any appropriate shape, size, type or configuration, such as of a generally rectangular shape (FIGS. 1, 2, 5 and 6). The spacer portion 46 may be located at any appropriate position on the support bracket 42, such as generally perpendicular to the stop portion 44 and the base plate 16. The spacer portion 46 may also extend generally perpendicularly outward from the inner tube 14, whereby the stop portion 44 and the spacer portion 46 form the general L-shape of the support bracket 42 (FIGS. 1 and 2).

The stop portion 44 and spacer portion 46 of the support bracket 42 may be of any appropriate shape or size. For example, the stop portion 44 and spacer portion 46 may be of a specified width (FIGS. 1, 2, 5 and 6). This width may provide a specified amount of spacing from the inner tube 14 to the locking pin 52 to thereby align the locking pin 52 into the proper position for the locking pin 52 to lock the base plate 16 and locking plate 24 to one another (FIGS. 2, 5 and 6).

In addition, the stop portion 44 and spacer portion 46 may be of specified lengths (FIGS. 1 and 2). The stop portion 44 of the support bracket 42 may be of a first length that may serve as a stop for the outer tube 12 when the outer tube 12 is fully retracted over inner tube 14 (FIGS. 2, 5 and 6). The spacer portion 46 of the support bracket 42 may be of a second length.

The gooseneck coupler 10 may also include a locking assembly 50 (FIGS. 1, 2, 5 and 6). The locking assembly 50 may be of any appropriate shape, size, type or configuration. The locking assembly 50 may be located at any appropriate position on the gooseneck coupler 10, such as located adjacent the lower end of the inner tube 14 (FIGS. 1, 2, 5 and 6). The locking assembly 50 may include locking pin 52, a pin housing 54 and a spring 56 (FIGS. 1, 2, 5 and 6).

The locking pin 52 may be of any appropriate shape, size, type or configuration, such as of a generally cylindrical shape (FIGS. 1, 2, 5 and 6). The locking pin 52 may be located at any appropriate position on the locking assembly 50. The pin housing 54 may be of any appropriate shape, size, type or configuration, such as of a generally cylindrical configuration (FIGS. 1, 2, 5 and 6). The pin housing 54 may be located at any appropriate position on the gooseneck coupler 10, such as adjacent the spacer portion 46 of the support bracket 42 (FIGS. 1, 2, 5 and 6). The pin housing 54 may be secured to the support bracket 42 by any appropriate means, such as by welding or the like. The spring 56 may be of any appropriate shape, size, type or configuration. The spring 56 may be located at any appropriate position on the locking assembly 50, such as adjacent and below the pin housing 54.

The locking assembly 50 may also include an upper handle 58 and a lower handle 60 (FIGS. 1, 2 and 5). The upper handle 58 and lower handle 60 may generally be parallel to one another and extend generally perpendicularly away from the locking pin 52 portion. The support bracket 42 may function as a hold-open positioning device for the upper handle 58 (FIGS. 1 and 5). The stop portion 44 may allow the upper handle 58 of the locking assembly 50 to rest upon the stop portion 44, whereby the stop portion 44 may be used as a hold-open position for the locking pin 52 against a bias of spring 56. The hold-open function may allow a user to release locking assembly 50 while maintaining locking pin 52 in an unlocked position.

The overall shape of the support bracket 42 may allow it to function as a stop, a hold-open device and as a spacer. The shape of the support bracket 42 and the location at which the support bracket 42 is placed on the inner tube 14 may allow the support bracket 42 to achieve this multi-purpose function. The support bracket 42 may function as a stop when the outer tube 12 is in a lowered or retracted position that may prevent compression or collapse of the gooseneck coupler 10 (FIGS. 2, 5 and 6). The support bracket may also function to limit the distance outer tube 12 may collapse onto inner tube 14 in the event of a dynamic (unintended) collapse. The support bracket 42 may also function as a spacer to locate the position of the locking pin 52 or locking pin guide 54 (FIGS. 2 and 6). The support bracket 42 may simplify the locking assembly 50 for the gooseneck coupler 10, thereby reducing material required, and providing several functions as described above.

Figure 7:
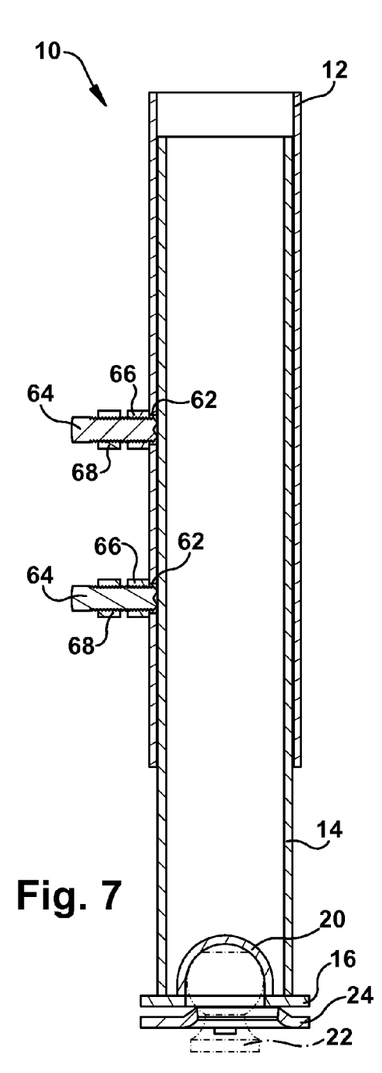
FIG. 7 illustrates a side cross-sectional view of the gooseneck coupler of FIG. 1 in an extended position.
Figure 8:
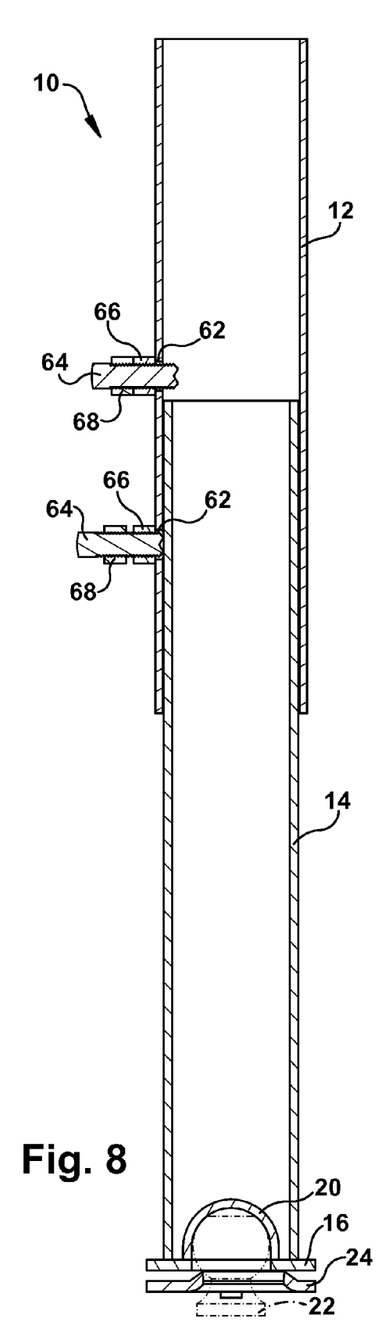
FIG. 8 illustrates a side cross-sectional view of the gooseneck coupler of FIG. 1 in an over extended position.

The outer tube 12 may include at least one aperture 62 (FIGS. 7 and 8). For example, the outer tube 12 may include any appropriate number of apertures 62, such as two, three, four, etc. In a non-limiting example, the outer tube 12 may include a pair of apertures 62. The apertures 62 may be of any appropriate shape, size, type or configuration, such as of a generally circular shape. The apertures 62 may be located at any appropriate position on the outer tube 12, such as vertically aligned and spaced along the outer tube 12 (FIGS. 1, 2, 7 and 8).

The gooseneck coupler 10 may also include at least one set screw 64 (FIGS. 1, 2, 7 and 8). For example, there may be any appropriate number of set screws 64, such as two, three, four, etc. In a non-limiting example, the gooseneck coupler 10 may include a pair of set screws 64. The set screws 64 may be of any appropriate shape, size, type or configuration. The set screws 64 may be located at any appropriate position on the gooseneck coupler 10, such as aligned and located partially within the apertures 62 of the outer tube 12 (FIGS. 7 and 8).

The outer tube 12 may include a mounting nut 66 located around each aperture 62 (FIGS. 7 and 8). For example, there may be any appropriate number of mounting nuts 66, such as two, three, four, etc. In a non-limiting example, the gooseneck coupler 10 may include correspondingly similar number of mounting nuts 66 as there are apertures 62. The mounting nuts 66 may be secured to the outer tube 12 by any appropriate means, such as by welding or the like. The mounting nuts 66 may be of any appropriate shape, size, type or configuration. The mounting nuts 66 may be located at any appropriate position on the outer tube 12, such as located around each aperture 62.

Each set screw 64 may utilize a fastener or nut 68 (FIGS. 1, 2, 7 and 8). Any appropriate shape, size, type or configuration of nut 68 may be utilized, such as a lock nut, jam nut or the like. For example, there may be any appropriate number of nuts 68, such as two, three, four, etc. In a non-limiting example, the gooseneck coupler 10 may include a correspondingly similar number of nuts 68 as there are set screws 64 (FIGS. 1, 2, 7 and 8). The nuts 68 may be located at any appropriate position on the gooseneck coupler 10, such as aligned with each set screw 64. The set screw 64 and nut 68 may be threaded into the outer wall of the inner tube 14

(FIGS. 7 and 8). The set screws 64 may tighten against the inner tube 14 of the gooseneck coupler 10, whereby the set screw 64 may lock the outer tube 12 and inner tube 14 together.

The set screws 64 may also function as an over-extension indicator of the outer tube 12. For example, the gooseneck coupler 10 may include an over-extension indicator via at least two set screws 64. The pair of set screws 64 may function as a visual indicator to the user that the outer tube 12 of the gooseneck coupler 10 has extended past an intended maximum extension range by utilizing the relative location of the set screws 64 (FIGS. 7 and 8).

When the inner tube 14 is positioned correctly inside the outer tube 12, the set screws 64 may relatively evenly tighten against the inner tube 14 to lock the tubes together (FIG. 7). If the outer tube 12 has been positioned beyond the proper range of full extension (over extended), the set screws 64 will not tighten properly or evenly and the user will know something is not correct. This difference will let the user know something has not been set up correctly. In a non-limiting example, if the outer tube 12 has extended too far away from the base plate 16, an upper set screw 64 will be able to be threaded further into the center of the outer tube 12 (FIG. 8). This will cause the user to notice a visual difference between the position of the upper and lower set screws 64 (FIGS. 7 and 8).

In typical gooseneck couplers that do not utilize a load bearing pin, the set screws 64 may have been placed near the bottom of the inner tube 14. This may allow the outer tube 12 to be extended beyond its intended extension limit. Placing the top set screw 64 higher on the outer tube 12, the top set screw 64 may serve as an indicator of over-extension. Lower positioned set screws 64 may not be able to indicate over-extension of the outer tube 12

Although the embodiments of the present invention have been illustrated in the accompanying drawings and described in the foregoing detailed description, it is to be understood that the present invention is not to be limited to the embodiments disclosed, but that the invention described herein is capable of numerous rearrangements, modifications and substitutions without departing from the scope of the claims hereafter.

The invention claimed is:

1. A gooseneck coupler comprising:
    an outer tube telescopically moveable relative to an inner tube along an axis, wherein said inner tube is secured to a base member;
    a locking member pivotally secured to said base member, wherein at least one of said locking member and said base member include a first locking pin aperture;
    a locking assembly comprising a handle and a locking pin, wherein said locking assembly is located adjacent said inner tube and said locking pin is insertable into said first locking pin aperture;
    a support bracket assembly secured to said inner tube, wherein said support bracket assembly includes a stop limiting telescopic movement between said inner and outer tubes and a spacer that laterally spaces said locking pin from said inner tube; and
    wherein said stop prevents said outer tube from telescopingly moving along said axis below said stop during a dynamic collapse of said outer tube relative to said inner tube.

2. A gooseneck coupler comprising:
    an outer tube telescopically moveable relative to an inner tube along an axis between an operative zone wherein the coupler is configured to support a load of a towed vehicle to an inoperative zone wherein the coupler is not configured to support the load of the towed vehicle, wherein said inner tube is secured to a base member;
    at least two apertures located through said outer tube;
    at least two set screws locatable through said at least two apertures, wherein said at least two set screws are tightened onto said inner tube generally preventing movement of said outer tube relative to said inner tube along said axis when said outer tube is in said operative zone; and
    wherein at least one of said set screws is axially positioned on said outer tube such as to not engage with said inner tube when said outer tube immediately exceeds said operative zone along said axis thereby reaching said inoperative zone and thereby providing an indicator that said outer tube has reached said inoperative zone.

3. The gooseneck coupler of claim 2, wherein the at least two set screws are substantially evenly tightened against said inner tube when said outer tube is in said operative zone.

4. The gooseneck coupler of claim 2, wherein said at least two set screws solely prevent relative telescopic movement between said inner and outer tubes when engaged with said inner tube.

5. The gooseneck coupler of claim 4, wherein said at least two set screws includes an upper set screw and a lower set screw.

6. The gooseneck coupler of claim 5, wherein said upper set screw is visually threaded further into said outer tube in relation to said lower set screw that is threaded into said inner tube when said outer tube is in said inoperative zone.

7. The gooseneck coupler of claim 2, wherein said at least two apertures are vertically spaced apart.

8. The gooseneck coupler of claim 2, further comprising a mounting nut located around each aperture in said outer tube.

9. The gooseneck coupler of claim 2, further comprising at least one jam nut located on each set screw.

10. A gooseneck coupler for engaging a towed vehicle to a towing vehicle, said gooseneck coupler comprising:
    an outer tube telescopically moveable relative to an inner tube along an axis between an operative zone wherein the coupler is configured to support a load of a towed vehicle to an inoperative zone wherein the coupler is not configured to support the load of the towed vehicle, wherein said inner tube is secured to a base member and said outer tube includes at least two apertures located through said outer tube;
    a locking member pivotally secured to said base member, wherein said locking member includes a first locking pin aperture;
    a locking assembly comprising a handle and a locking pin, wherein said locking assembly is located adjacent said inner tube and said locking pin is insertable into said first locking pin aperture;
    a support bracket secured to said inner tube, wherein said support bracket includes a stop and a spacer, and said spacer aligns said locking pin into said first locking pin aperture;
    at least two set screws locatable through said at least two apertures, wherein said at least two set screws are tightened onto said inner tube generally preventing telescopic movement of said outer tube relative to said inner tube along said axis when said outer tube is in said operative zone; and
    wherein at least one of said at least two set screws is axially positioned on said outer tube such as to not engage with said inner tube when said outer tube immediately exceeds said operative zone along said axis thereby reaching said inoperative zone and thereby providing a visual indicator that said outer tube has reached said inoperative zone.

11. The gooseneck coupler of claim 10, wherein said outer tube rests upon said stop when in a fully retracted position and said handle rests upon said stop when in an unlocked position.

12. The gooseneck coupler of claim 10, wherein said at least two set screws will not tighten evenly against said inner tube when said outer tube is in said inoperative zone.

13. The gooseneck coupler of claim 1, wherein said locking member comprises a locking plate.

14. The gooseneck coupler of claim 13, wherein said base member comprises a base plate.

15. The gooseneck coupler of claim 14, wherein said stop and said spacer are attached.

16. The gooseneck coupler of claim 1, wherein an other of said locking member and said base member includes a second locking pin aperture generally alignable with said first locking pin aperture and wherein said locking pin is insertable into said first and second locking pin apertures.

17. The gooseneck coupler of claim 10, wherein said locking member comprises a locking plate.

18. The gooseneck coupler of claim 17, wherein said base member comprises a base plate.

19. The gooseneck coupler of claim 18, wherein said stop and said spacer are attached.

20. The gooseneck coupler of claim 10, wherein said base member includes a second locking pin aperture generally alignable with said first locking pin aperture and wherein said locking pin is insertable into said first and second locking pin apertures.

21. The gooseneck coupler of claim 1, wherein said stop extends around a portion of a circumference of said inner tube.

22. The gooseneck coupler of claim 10, wherein said stop extends around a portion of a circumference of said inner tube.

23. The gooseneck coupler of claim 10, wherein said stop prevents said outer tube from telescopingly moving along said axis below said stop during a dynamic collapse of said outer tube relative to said inner tube.

24. The gooseneck coupler of claim 4, wherein no cross pin prevents relative telescopic movement between said inner and outer tubes when engaged with said inner tube.

25. The gooseneck coupler of claim 15, wherein said support bracket assembly is located generally perpendicularly to said inner tube.

26. The gooseneck coupler of claim 15, wherein said stop is generally parallel to said base plate.

27. The gooseneck coupler of claim 26, wherein said outer tube is telescopically moveable relative to said inner tube toward and away from said base plate.

28. The gooseneck coupler of claim 27, wherein said outer tube rests on said stop when in a fully retracted position.

29. The gooseneck coupler of claim 26, wherein a portion of said handle may rest upon said stop when said locking pin is in an unlocked position.

30. The gooseneck coupler of claim 29, wherein said stop maintains said locking pin in said unlocked position against a biasing force of a spring member.

31. The gooseneck coupler of claim 16, wherein said spacer axially aligns said locking pin with said first and second locking pin apertures.

32. The gooseneck coupler of claim 25, wherein said stop is generally perpendicular to said spacer.

* * * * *